US012080474B1

(12) United States Patent
Sahu et al.

(10) Patent No.: US 12,080,474 B1
(45) Date of Patent: Sep. 3, 2024

(54) TRANSFORMER AND A TRANSFORMER ARRANGEMENT

(71) Applicant: Hitachi Energy Ltd, Zürich (CH)

(72) Inventors: Kiran Chandra Sahu, Västerås (SE); Anders Daneryd, Västerås (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/034,986

(22) PCT Filed: Feb. 11, 2022

(86) PCT No.: PCT/EP2022/053427
§ 371 (c)(1),
(2) Date: May 2, 2023

(87) PCT Pub. No.: WO2022/171829
PCT Pub. Date: Aug. 18, 2022

(30) Foreign Application Priority Data

Feb. 11, 2021 (EP) .................................... 21156690

(51) Int. Cl.
*H01F 27/33* (2006.01)
*H01F 27/30* (2006.01)
*H01F 27/32* (2006.01)

(52) U.S. Cl.
CPC ........... *H01F 27/33* (2013.01); *H01F 27/306* (2013.01); *H01F 27/321* (2013.01)

(58) Field of Classification Search
CPC ....... H01F 27/33; H01F 27/306; H01F 27/321
See application file for complete search history.

(56) References Cited

U.S. PATENT DOCUMENTS 3,309,639 A * 3/1967 Goolsby, Jr. .......... H01F 37/005 336/100
3,786,387 A * 1/1974 Hori ........................ H01F 27/33 336/212

(Continued)

FOREIGN PATENT DOCUMENTS

CN 103348423 A 10/2013
CN 110415942 A * 11/2019

(Continued)

OTHER PUBLICATIONS

Naranpanawe Lakshitha et al.:("Finite element modelling of a transformer winding for vibration analysis", 2016AUSTRAL-ASIAN Universities Power Engineering Conference (Aupec), IEEE, Sep. 25, 2016 (2016-09-25), pp. 1-6, XP033009517. (Year: 2016).*
International Search Report and Written Opinion of the International Searching Authority, PCT/EP2022/053427, mailed May 27, 2022, 39 pages.

(Continued)

*Primary Examiner* — Malcolm Barnes
(74) *Attorney, Agent, or Firm* — Sage Patent Group

(57) ABSTRACT

A transformer comprising at least two phase windings, each phase winding having coil turns around a coil axis, wherein the at least two phase windings comprise at least a first type of phase winding and a second type of phase winding, each of the first type of phase winding and the second type of phase winding comprising a plurality of winding portions comprising at least a first winding portion and a second winding portion, the first type of phase winding comprising a first winding portion having a first winding portion stiffness and a second winding portion having a second winding portion stiffness, and characterized in that a stiffness difference between said first winding portion stiffness and said second winding portion stiffness of said first type of phase winding is such that the acoustic power is minimized at said main frequency.

16 Claims, 3 Drawing Sheets

(56) References Cited

U.S. PATENT DOCUMENTS

| | | | | |
|---|---|---|---|---|
| 3,815,068 | A * | 6/1974 | Hori | H01F 27/322 336/224 |
| 9,020,156 | B2 | 4/2015 | Dantele et al. | |
| 2015/0170826 | A1* | 6/2015 | Lau | H01F 27/2823 336/220 |

FOREIGN PATENT DOCUMENTS

| | | | | |
|---|---|---|---|---|
| EP | 2602799 | A1 * | 6/2013 | H01F 27/306 |
| JP | H04318905 | A | 11/1992 | |
| JP | H1097928 | A | 4/1998 | |
| JP | 2013183151 | A * | 9/2013 | |
| KR | 1020070075973 | A | 7/2007 | |
| KR | 1020210003348 | A | 1/2021 | |
| WO | WO-02063605 | A1 * | 8/2002 | G10K 11/1788 |
| WO | 2014061154 | A1 | 4/2014 | |

OTHER PUBLICATIONS

International Preliminary Report of Patentability, PCT/EP2022/053427, mailed Jan. 20, 2023, 18 pages.

Naranpanawe, Lakshitha, et al, “Finate Element Modeling of a Transformer Winding for Vibration Analysis”, XP033009517, Australasian Universities Power Engineering Conference, Sep. 25, 2016, 6 pages.

Lakshitha Naranpanawe, et al., “Finate Element Modelling of a Transformer Winding for Vibration Analysis”, XP033009517, Australasian Universities Power Engineering Conference, Sep. 25, 2016, 6 pages.

Notice of Reasons for Refusal for Japanese Patent Application No. 2023-545846, mailed Jan. 9, 2024, 6 pages.

Notification To Grant Patent Right for Invention, Chinese Patent Application No. 202280014421.2, mailed Jan. 12, 2024, 6 pages.

Decision for Grant of Patent, Korean Patent Application No. 10-2023-7019627, mailed Jul. 19, 2023, 3 pages.

* cited by examiner

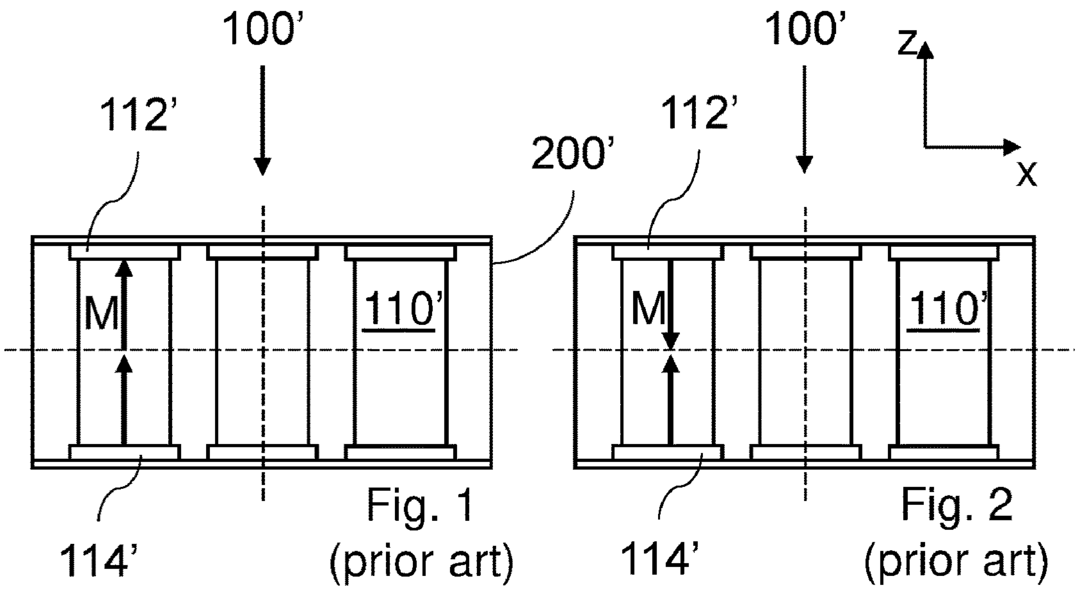
Fig. 1 (prior art)
Fig. 2 (prior art)
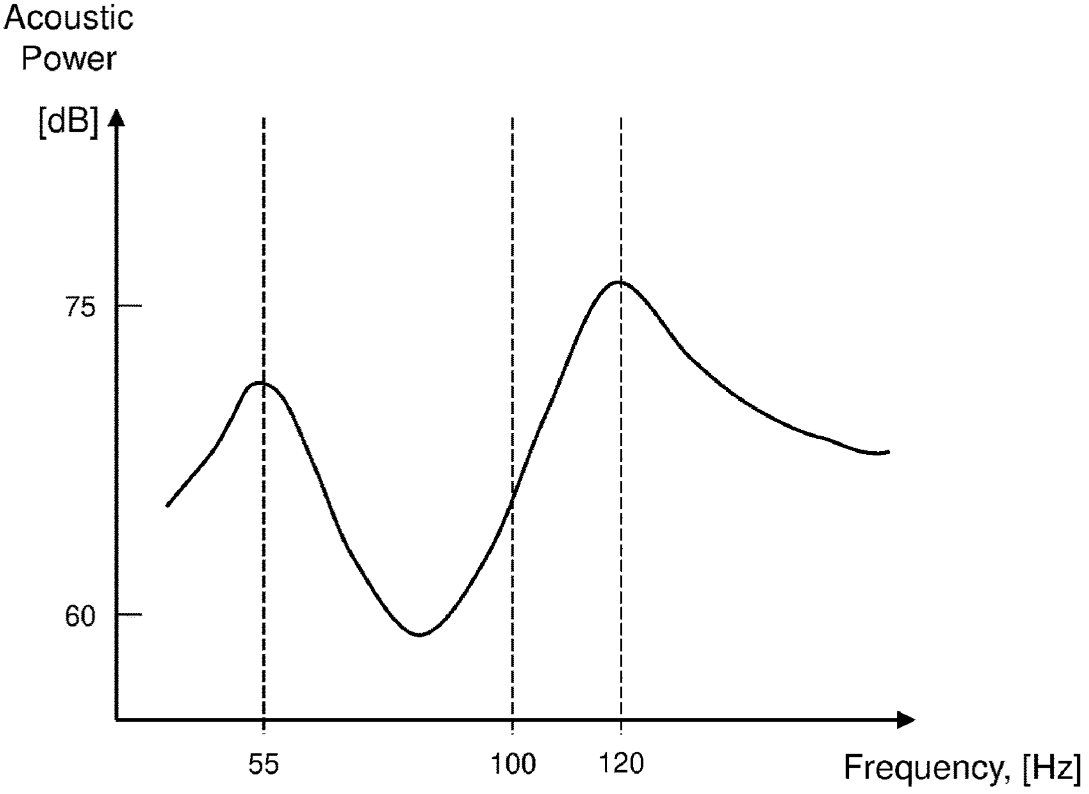
Fig. 3 (prior art)

TRANSFORMER AND A TRANSFORMER ARRANGEMENT

CROSS REFERENCE TO RELATED APPLICATIONS

This application is a 35 U.S.C. § 371 national stage application of PCT International Application No. PCT/EP2022/053427 filed on Feb. 11, 2022, which in turn claims priority to European Patent Application No. 21156690.6, filed on Feb. 11, 2021, the disclosures and content of which are incorporated by reference herein in their entireties.

TECHNICAL FIELD

The present disclosure relates to a transformer. The disclosure also relates to a transformer arrangement comprising such a transformer.

BACKGROUND

Transformers, as any other industrial products, must comply with various requirements on noise levels. It is known to people skilled in the art that the acoustic power P emitted from a vibrating structure acted upon by forces F can be expressed as $$P=F^H\Phi B_{F\Phi}\Phi^T F$$

in which $\Phi$ represents the collection of mode shapes associated with the mechanical properties of the structure, and the operator $B_{F\Phi}$ implicitly depends on the geometry of the structure, the frequency, and also materials properties of the acoustic and structural media in question. Furthermore, H denotes the Hermitian transpose of the vector, and T denotes a regular vector transposition. The quantity $\Phi^T F$ is here to be interpreted as the scalar or dot product of the two vectors, indicating that when these two vectors are orthogonal, the resulting acoustic power goes to zero. This orthogonality is in this disclosure proposed to be brought about by promoting asymmetric winding resonance modes which are acted upon by the inherently symmetric force distributions. Regardless of the actual proximity of the frequency of the mode to the double the network frequency, the resulting acoustic power is reduced.

In more detail, the equation of motion for a mechanical assembly, in this context typically a winding with supporting structures or a set of such windings, is in numerical approaches generally expressed as $$M\ddot{u}+C\dot{u}+Ku=F$$

in which u is the displacement vector, M, C, K, are the system mass, damping, stiffness, matrices, respectively, and F the force vector.

Based on the above system matrices and introducing in a well-known manner the system mode shapes $\Phi$ and modal coordinates z, $$u=\Phi_z, \Phi=[\varphi_n], n=1, \ldots, N$$

it is equally well known that the frequency domain modal displacement $z_n$ at frequency $\omega$ is given by:

$$z_n = \frac{\varphi_n^T F}{\omega_n^2 - \omega^2 + j2\omega\omega_n\xi_n},$$

such that the modal displacement component $u_{mn}$—arbitrary location m in the winding, mode n—can be expressed as $$u_{mn} = \varphi_{mn} z_n = \varphi_{mn}\frac{\varphi_n^T F}{\omega_n^2 - \omega^2 + j2\omega\omega_n\xi_n}, m = 1, \ldots, M$$

Here, the parameter $\xi_n$ denotes the damping ratio (fraction of critical damping), and for further clarity the quantity $u_m$ is expressed as a summation over the system modes according to $$u_m(\omega) = \sum_n \varphi_{mn}\frac{\varphi_n^T F}{\omega_n^2 - \omega^2 + j2\omega\omega_n\xi_n}$$

Further studying the fraction in this expression, the classical approaches to mitigate noise and vibrations can readily be discussed. Obviously, when the driving frequency a is close to a resonance frequency on, or a narrow set of such frequencies, the structural responses $x_m$ might grow beyond permissible levels, and the commonplace methods to alleviate this effect are

- finding ways to increase the damping, dissipation of vibrational energy, $\xi_n$, and/or
- changing the resonance frequencies on by changing the stiffness and/or mass of the mechanical assembly, and/or
- reducing the magnitude of the force, F, acting on the assembly, or otherwise redirect its action Furthermore, the second commonplace method of changing the resonance frequencies might lead to resonance phenomena controlled by the new resonances which will inevitably appear close to the exciting frequency $\omega$. In fact, in the transformer noise context, it is important to also pay close attention to winding dynamics during short-circuit events, in that here the mechanical frequency content during a few cycles of the network frequency (usually, but not limited to, 50 or 60 Hz) varies between the network frequency and two times the same. The latter being the steady state driving frequency $\omega$ implicitly assumed in the above theory background. In other words, shifting resonances generally has to be executed with great care for ensuring the integrity of the transformer system as a whole.

Finally, the electromagnetic force distributions acting on the winding conductors should be considered as givens with few design degrees of freedom for controlling noise.

SUMMARY

Therefore, an object of the disclosure is to provide an improved transformer. More specifically, an object of the disclosure is to provide a transformer having appropriately low noise emissions and which is cost-effective to build and assemble. Another object of the disclosure is to provide a transformer arrangement comprising a transformer in a transformer tank.

According to a first aspect of the disclosure the object is achieved by a transformer comprising at least two phase windings. Each phase winding has coil turns around a coil axis. The transformer is adapted to transform voltage at a predetermined frequency, when the transformer is operating. The transformer is excited by a mechanical load having a main frequency corresponding to the predetermined frequency multiplied by two and has vibration modes. The combination of load and vibration modes results in a vibration of the transformer. The transformer has a set of vibration modes. Each vibration mode has a vibration mode frequency, wherein at least one main contributing vibration mode of the set of vibration modes is the vibration mode resulting in the largest acoustic power, of said vibration modes, when the transformer is excited by the load.

The at least two phase windings comprise at least a first type of phase winding and a second type of phase winding. Each of the first type of phase winding and the second type of phase winding comprises a plurality of winding portions comprising at least a first winding portion and a second winding portion.

The first type of phase winding comprising a first winding portion having a first winding portion stiffness and a second winding portion having a second winding portion stiffness, wherein a stiffness difference between the first winding portion stiffness and the second winding portion stiffness of said first type of phase winding is such that the acoustic power is minimized at said main frequency.

For the sake of clarity, the present disclosure does not make any further reference to the controlling of resonances a), for noise minimization, or any of the other classical approaches discussed in the background section above.

A vibration mode of the transformer describes the deformation that the transformer would show when vibrating at the natural frequency during excitation under load. The set of vibration modes thus indicates how the transformer behaves under a dynamical load, such as when excited by an oscillating electromagnetic field generated by the alternating current at the predetermined frequency. The vibration modes determine the acoustic power of the transformer, e.g., how much air is displaced during vibration, and consequently how efficiently noise is generated by the transformer at the mechanical main frequency.

The predetermined frequency may for instance be 50 Hz or 60 Hz. At these frequencies, the corresponding main frequencies of vibration, at which the transformer is operating, thus become 100 Hz or 120 Hz, respectively.

The at least one main contributing vibration mode is, as outlined above, the vibration mode contributing to the highest acoustic power, when the transformer is excited by the load at the main frequency. The acoustic power generated by the transformer, and consequently noise generation, may thus be reduced when at least one phase winding is adapted such that the dot products $\varphi_n^T F$ of an assembly of phase windings constituting the transformer approach zero. By way of example, the mode shapes in a structure, such as a transformer in a transformer tank may be modified by adapting the mass and/or the elasticity of the structure. However, it is also envisaged that other characteristics of the transformer may have an impact on the mode shapes.

Generally, the object is achieved by focusing on the nominator of the governing fraction given in the background section above, in that the dot products $\varphi_n^T F$ are optimized to approach zero, regardless of the properties of the mechanisms being represented by the terms forming the denominator. Thus, the structural vibrations can be controlled for low noise performance.

By the provision of a transformer as disclosed herein, the vibration modes may be changed by modifying the elasticity, i.e., stiffness, of at least one phase winding. Providing winding portions of different winding portion stiffnesses is a convenient and cost-effective way of modifying the main contributing vibration mode shape, from a symmetric mode shape to an asymmetric mode shape, as discussed hereinabove.

Optionally, the first winding portion of the first type of phase winding has a first winding portion stiffness, as seen along the coil axis, and the second winding portion of the first type of phase winding has a second winding portion stiffness, as seen along the coil axis. The first winding portion stiffness is different from the second winding portion stiffness.

Optionally, the first type of phase winding is provided with a plurality of spacers between the coil turns. The first winding portion of the first type of phase winding is provided with a first type of spacers and the second winding portion of the first type of phase winding is provided with a second type of spacers. The first type of spacers being different from said second type of spacers.

The symmetric force distribution of the electromagnetic load may excite large vibrations along the coil axis (first axis) of the at least one phase winding. Therefore, arranging the different winding portions with different stiffnesses, along the coil axis of at least the first type of phase winding is an efficient way of affecting the vibration mode shapes of the phase winding and to reduce noise of the transformer, as a whole, at the main mechanical frequency. As non-limiting examples, the stiffness of a phase winding may be modified by arranging the winding portions with different spacers, CTC cables and/or different stiffness distributions.

Optionally, the first type of spacers has a first modulus of elasticity and the second type of spacers has a second modulus of elasticity. The first modulus of elasticity is different from said second modulus of elasticity.

The spacers are conventionally distributed along the axial length of the phase winding, between the coil turns, so as to separate and electrically isolate the turns of the coil from each other. When the coil turns vibrate, the elasticity of the spacers affect the elasticity of the phase winding and the transformer as a whole. Thereby, the mode shape of the at least one main contributing mode, or the symmetric mode, of the transformer may be modified by providing spacers of different modulus of elasticity in different winding portions. The modulus of elasticity may for instance be selected by selecting appropriate materials for the spacers. The modulus of elasticity of selectable/applicable materials range between 0.1 GPa-120 GPa, or higher.

Optionally, the first winding portion is located radially inwards of said second winding portion.

The phase winding may have an inner winding and an outer winding. The inner winding may be a low voltage winding and the outer winding may be a high voltage winding, or vice versa. Advantageously, for simplified assembly and production of the phase winding, the first winding portion may be the inner winding and the second winding portion may be the outer winding, so that the first winding portion is located radially inwards of the second winding portion. In this way, the whole inner winding has one type of winding portion stiffness and the whole outer winding has different type winding portion stiffness. As disclosed hereinabove, the provision of a first winding portion whose stiffness differs from the second winding portion modifies the shape of the at least one main contributing mode, or the symmetric mode, towards an asymmetric mode, so as to reduce vibrations and noise at the main frequency.

Optionally, the first winding portion of the second type of phase winding has the first winding portion stiffness, as seen along said coil axis, and said second winding portion of the second type of phase winding also has the first winding portion stiffness, as seen along said coil axis.

In this manner, the first winding portion and the second winding portion of the second type of phase winding have the same winding portion stiffness.

Optionally, the transformer comprises three phase windings arranged along an axis x. One first type of phase winding is arranged centrally, between two second type of phase windings.

The above arrangement of phase windings according to the present disclosure has shown an especially effective reduction in noise.

Optionally, the transformer comprises three phase windings arranged along an axis x. One second type of phase winding is arranged centrally, between two first type of phase windings.

The above arrangement of phase windings according to the present disclosure has shown an especially effective reduction in noise.

According to a second aspect of the disclosure there is provided a transformer arrangement comprising a transformer as disclosed hereinabove, wherein the transformer is enclosed in a transformer tank.

The transformer may be immersed in an electrically insulating medium, such as oil, in the transformer tank. By the provision of at least one phase winding according to the disclosure, the main contributing mode, or the symmetric mode, of the transformer may be modified to reduce vibration and noise of the transformer arrangement. Consequently, such a transformer in a transformer tank will cause the transformer tank walls to generate less noise.

BRIEF DESCRIPTION OF THE DRAWINGS

Further objects and advantages of, and features of the disclosure will be apparent from the following description of one or more embodiments, with reference to the appended drawings, where:

FIG. 1 shows a side view cross-section of an exemplary prior art transformer in an asymmetric vibration mode;

FIG. 2 shows a side view cross-section of the prior art transformer of FIG. 1 in a symmetric vibration mode;

FIG. 3 shows the noise power generated by the prior art transformer of FIG. 1 and FIG. 2 at predetermined frequencies;

DETAILED DESCRIPTION

The present disclosure is developed in more detail below referring to the appended drawings which show examples of embodiments. The disclosure should not be viewed as limited to the described examples of embodiments; instead, it is defined by the appended patent claims. Like numbers refer to like elements throughout the description.

FIG. 1 and FIG. 2 show side view cross-sections of an exemplary prior art transformer 100' under different vibration modes. The prior art transformer 100' has a first extension along a first axis z, a second extension along a second axis x and a third extension along a third axis y (not shown). The first, second and third axes are perpendicular to each other. The prior art transformer 100' is further exemplified with three phase windings 110' being located at a distance from each other as seen along said second axis (x).

Each phase winding has first end and an opposite second end along the first axis (z). The first and second ends are respectively provided with a first pressplate 112' and a second pressplate 114', between which two pressplates the phase winding 110' is clamped. When the transformer 100' is in operation, electromagnetic forces and the clamping of the phase windings between the pressplates generate load noise, which is a significant part of the total noise of transformers, especially for large units.

Symmetric movements (piston-like displacements) of a transformer tank 200', in which the transformer 100' may be enclosed, radiate significant noise to the far field as compared to asymmetric movement because symmetric vibrations displace more air and thereby radiate sound more efficiently than asymmetric movements. Phase windings 110' under load usually vibrate at 100 Hz or 120 Hz mechanical main frequency (i.e., 50 Hz or 60 Hz predetermined electrical operating (excitation) frequency multiplied by two).

FIGS. 1 and 2 illustrate the movement of the pressplates 112', 114' by arrows M of the transformer 100'. For the sake of clarity, the arrows are only shown for one phase winding 110'. In practice, for the prior art transformer 100', all phase windings 110' exhibit the same vibration pattern, albeit at a 1200 phase shift in relation to each other, for e.g., a three-phase transformer 100' such as shown in FIG. 1 and FIG. 2.

FIG. 3 shows how acoustic power of the transformer 100' varies with frequency. The horizontal axis displays the mechanical vibration frequency. The curve represents a superposition of vibration modes of the structure of the transformer 100'. The modes of interest of the transformer 100' may be identified at the peak amplitudes, where the acoustic power is largest.

Figure 4:
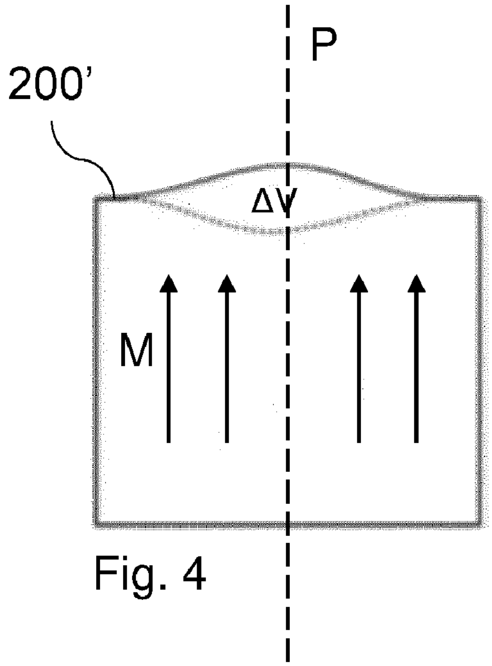
FIG. 4 illustrates the concept of noise generation in a symmetric vibration mode.
Figure 5:
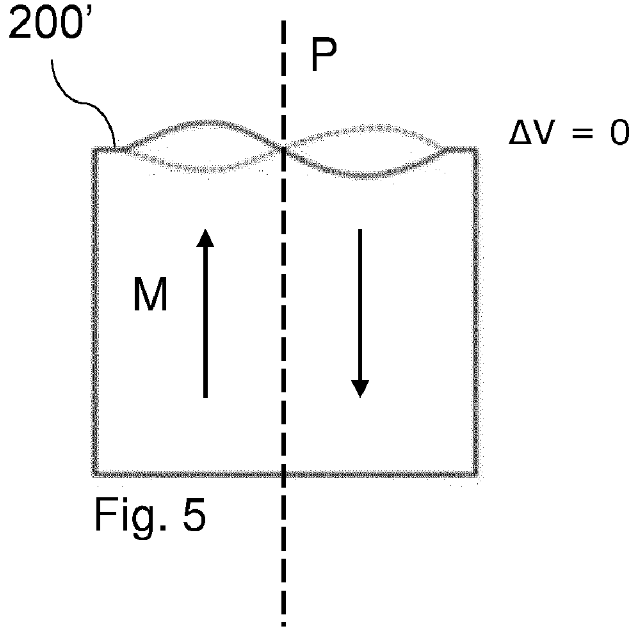
FIG. 5 illustrates the concept of noise generation in an asymmetric vibration mode.

FIG. 4 and FIG. 5 illustrate symmetric and asymmetric vibration modes, respectively and further explain the sound producing properties thereof. FIG. 4 conceptually shows a symmetric mode acting on the transformer tank 200'. It can be seen that a certain volume of media, ΔV (positive or negative), such as air, surrounding the transformer tank 200' is displaced. This displacement radiates noise to the audible far field, which may be perceived as disturbing noise. In contrast, the asymmetric vibration mode shown in FIG. 5 moves one part of the transformer tank 200' up as another part is moved down, theoretically resulting in a net volume displacement, ΔV, equal to zero. Such an asymmetric vibration mode radiates noise to the near field, which is not audible at a distance. In other words, it is not perceived as disturbing noise. A center plane P is shown in FIG. 4 and FIG. 5. The arrows M in FIG. 4 illustrate how every portion of the transformer tank 200', located on opposite sides of the center plane P, is displaced in the same direction at the same time for displacements in directions parallel to the center plane P. In FIG. 5 the asymmetric vibration mode results in opposing directions on opposite sides of the center plane P.

Figure 6:
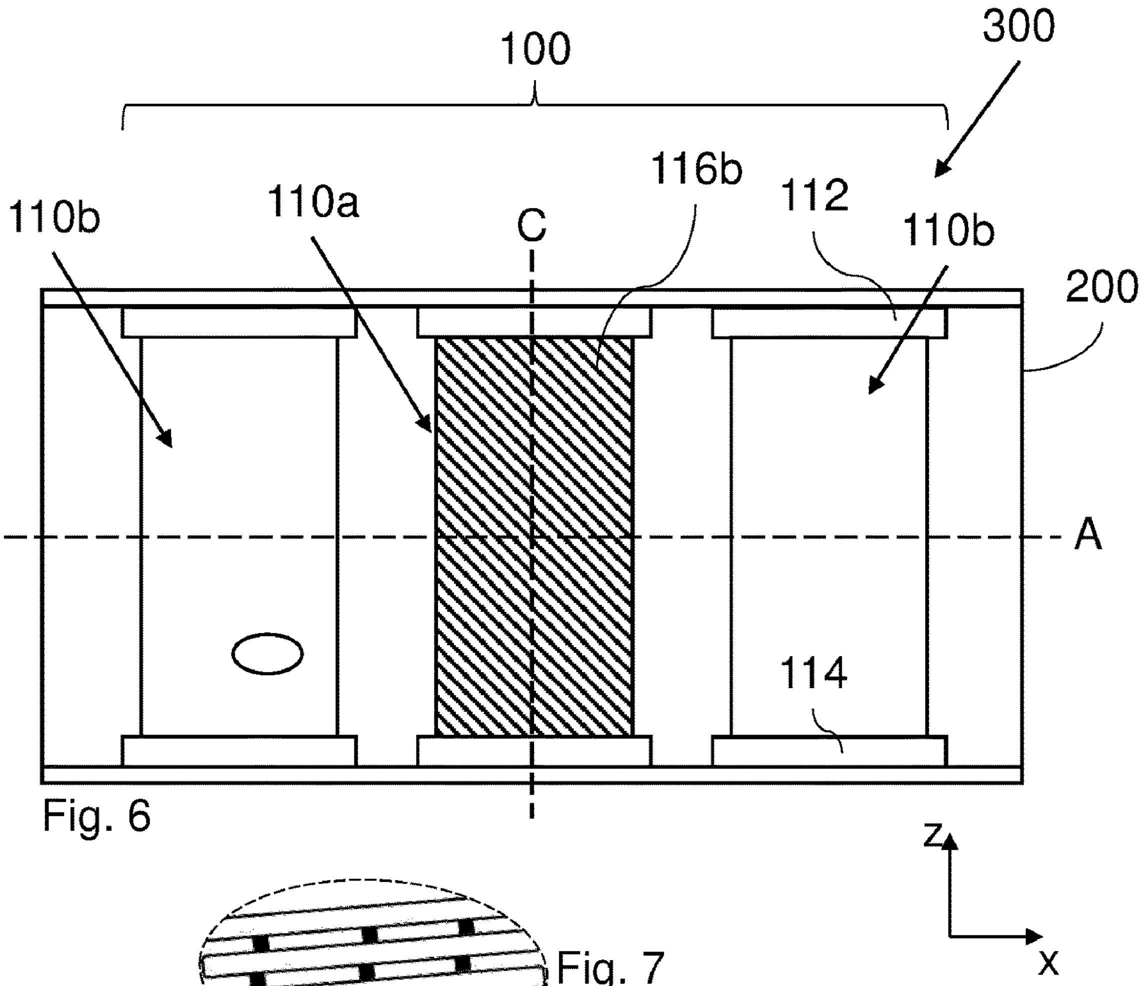
FIG. 6 shows a side view cross-section of an exemplary transformer according to the present disclosure.

FIG. 6 shows a side view cross-section of an exemplary transformer 100 according to the present disclosure. The transformer 100 comprises at least two phase windings 110. The illustrated exemplary transformer comprises three phase windings 110. Each phase winding 110 has coil turns 120 (FIG. 7) around a coil axis. The transformer 100 is adapted to transform voltage at a predetermined frequency, when the transformer 100 is operating. The transformer 100 is excited by a mechanical load having a main frequency corresponding to the predetermined frequency multiplied by two and having vibration modes. The combination of load and vibration modes results in vibration of the transformer 100. The transformer 100 further has a set of vibration modes, each vibration mode having a vibration mode frequency, where at least one main contributing vibration mode of the set of vibration modes is the vibration mode which results in the largest acoustic power, of the vibration modes, when the transformer 100 is excited by the load.

The at least two phase windings 110 comprise at least a first type of phase winding 110*a* and a second type of phase winding 110*b*, each of the first type of phase winding 110*a* and the second type of phase winding 110*b* comprises a plurality of winding portions 116 comprising at least a first winding portion 116*a* and a second winding portion 116*b*. The first type of phase winding (110*a*) comprises a first winding portion (116*a*) having a first winding portion stiffness and a second winding portion (116*b*) having a second winding portion stiffness. A stiffness difference between said first winding portion stiffness and said second winding portion stiffness of said first type of phase winding is such that the acoustic power is minimized at the main frequency.

Figure 7:
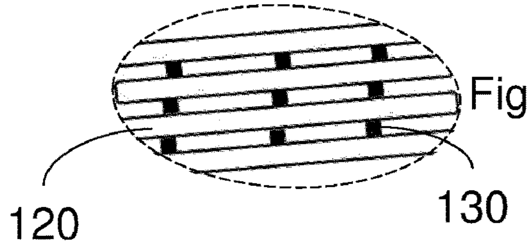
FIG. 7 is detailed view of coil turns and spacers of the transformer of FIG. 6.

FIG. 7 shows a magnified detail of the coil turns 120 of a phase winding 110. The at least one phase winding 110 is provided with a plurality of spacers 130 between the coil turns 120. The spacers are conventionally distributed along the axial length of the phase winding 110, between the coil turns, so as to separate and electrically isolate the turns of the coil from each other.

The transformer 100 further has a first extension along a first axis z. The coil axis is parallel to the first axis z. The transformer 100 has a second extension along a second axis x and a third extension along a third axis y (see FIG. 8). The first, second and third axes are perpendicular to each other and the center of the at least two phase windings 110 are located at a distance from each other as seen along said second axis x. The transformer 100 comprises a first center plane A which extends along the second axis x and third axis y and splits the transformer in half, as seen in along the first axis z. The transformer 100 comprises a second center plane B (see FIG. 8) which extends along the second axis x and first axis z and splits the transformer 100 in half, as seen in along the third axis y. The transformer 100 comprises a third center plane C which extends along the third axis y and first axis z and splits said transformer 100 in half, as seen in along the second axis x.

Each phase winding 110 may have a first end and an opposite second end along the coil axis, i.e., parallel with the first axis z. The first and second ends are respectively provided with a first pressplate 112 and a second pressplate 114, between which two pressplates the phase winding 110 is clamped.

A symmetric mode of mechanical vibration of said transformer 100 results in that every portion of said transformer 100, located on opposite sides of one of said center planes A, B, C, are displaced in the same direction at the same time for displacements in directions parallel to the center plane concerned. An asymmetric mode of mechanical vibration of said transformer 100 results in that every portion of said transformer 100, located on opposite sides of one of said center planes A, B, C, are displaced in the opposite direction at the same time for displacements in directions parallel to the center plane concerned.

A mode spectrum may be used to study a structure's vibration amplitude in response to different frequencies. Devices and methods for creating a mode spectrum are known to a person skilled in the art. A transformer tank wall can for instance be caused to vibrate by means of a pulse hammer and the vibrations of the tank wall can be measured by acceleration sensors or by piezoelectric force transducers that are distributed over the surface of the tank wall, for example. These measured signals can be forwarded to a computer system which performs a modal analysis and numerically determines the dynamic characteristics of the tank wall therefrom.

As discussed in conjunction with FIGS. 1-5, the noise generating mechanism of transformers, e.g., power transformers, is controlled by a nearly symmetric phase winding axial force distribution. The transformer 100 of the present disclosure seeks to break this match by introducing an asymmetric vibration mode shape in an assembly of phase windings which constitute the transformer 100 such that the dot products $\varphi_n^T F$ tend towards zero. The force distribution for a transformer is a given due to the structure. The shape and design of the core, the coil turns and/or pressplates are presets to obtain the desired electrical performance of the transformer. Other properties on which transformer vibrations depend may, however, be modified without affecting performance. Such a property is mechanical stiffness. Another property is the mass of the phase windings 110. However, the degrees of freedom for modifying mass are limited due to design restrictions placed on transformers and windings.

For this purpose, and as described above, the transformer 100 according to the present disclosure, has at least one of its phase windings 110 provided with a plurality of winding portions 116. The plurality of winding portions comprises at least a first winding portion 116*a* and a second winding portion 116*b*, wherein the first winding portion 116*a* has a first winding portion stiffness and said second winding portion 116*b* has a second winding portion stiffness.

Figure 8:
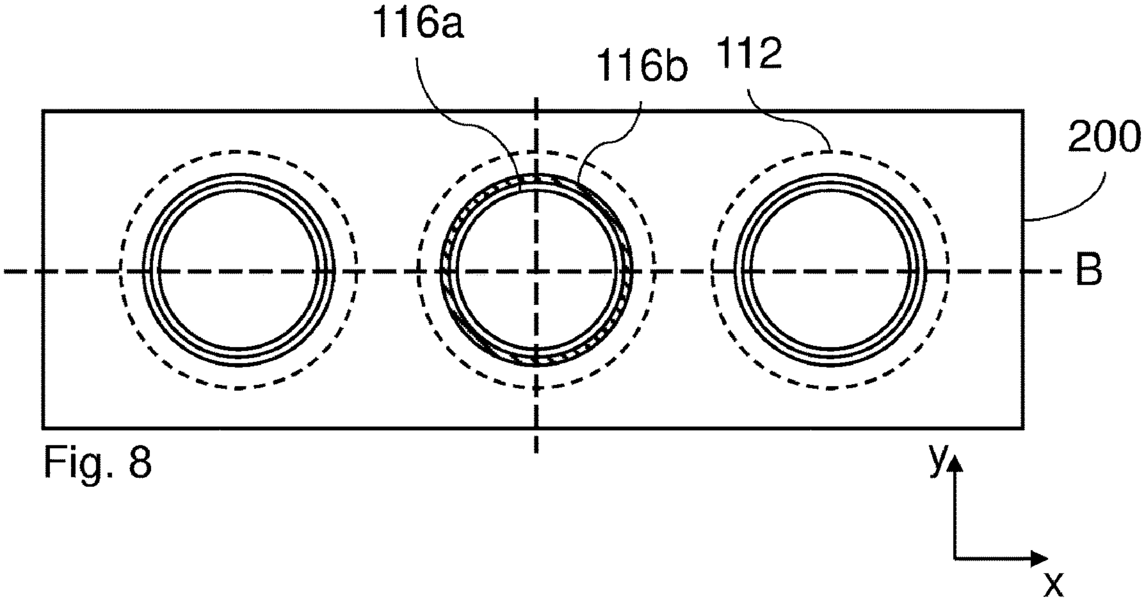
FIG. 8 shows a top view cross-section of the exemplary transformer of FIG. 6.

In the exemplary embodiment of FIG. 8, which is a top-side cross-sectional view of the exemplary transformer 100 of FIG. 6, each phase winding 110 is shown to have an inner winding and an outer winding. The inner winding may be a low-voltage winding and the outer winding may be a high-voltage winding, or vice versa. The first winding portion 116*a* may be located radially inwards of the second winding portion 116*b*. In the exemplary embodiment of FIG. 8, the first winding portion 116*a* may be a low-voltage winding and the second winding portion 116*b* may be a high-voltage winding.

According to the present disclosure, a phase winding comprises at least two winding portions 116. Thus, any number of winding portions 116 greater than two is also within the scope of the disclosure.

A winding portion 116 herein means a part of the coil turns of a phase winding 110. As exemplified in FIG. 8, a winding portion 116 may be the entire inner or outer winding. A winding portion may alternatively be a part of a winding, such as a section of a winding, limited in length along the first axis z (not shown). A winding portion may also/alternatively be a sector of a winding, limited by an angle φ, around the coil axis, to a circumferential sector of the winding.

The introduction of a stiffness difference or a mass difference, or a stiffness difference AND a mass difference, between the winding portions 116 breaks the symmetric mode of mechanical vibration and instead introduces an asymmetric mode of vibration in the transformer comprising the at least one phase winding 110 having differing winding portions. As a result of the at least one differing phase winding, the symmetric mode of mechanical vibration of the transformer 100 as a whole is broken.

In a transformer arrangement 300, such as shown in FIG. 6 or FIG. 8, comprising a transformer 100 according to the present disclosure, enclosed in a transformer tank 200, noise emitted to the surroundings is significantly reduced. This is a consequence of breaking the symmetric mode of mechanical vibration in the transformer 100. Thereby the symmetric mode of the transformer tank 200 is also broken, such that acoustic power, and noise radiated from the transformer tank 200, are reduced.

In order to break the symmetric mode of mechanical vibration of the transformer 100, the first winding portion 116*a* of the first type of phase winding 110*a* may have a first winding portion stiffness, as seen along the coil axis z. The second winding portion 116*b* of the first type of phase winding 110*a* may have a second winding portion stiffness, as seen along the coil axis z. As before, the first winding portion stiffness is different from said second winding portion stiffness.

The first winding portion 116*a* is provided with a first spacer distribution and the second winding portion 116*b* is provided with a second spacer distribution. The first spacer distribution is different from said second spacer distribution. Choice of materials for the spacers 130, and/or the density of the spacer distribution, are factors that may be used to break the symmetric mode of mechanical vibration. When the coil turns 120 vibrate, the elasticity provided by the spacers 130 affect the stiffness of the phase winding 110 and the transformer 100 as a whole, and thereby affect the modes of vibration of the transformer 100, the oil and the transformer tank 200.

The first spacer distribution may comprise a first type of spacers and the second spacer distribution may comprise a second type of spacers. The first type of spacers is different from said second type of spacers. The first type of spacers may for instance have a first modulus of elasticity and the second type of spacers may have a second modulus of elasticity. The first modulus of elasticity is different from said second modulus of elasticity by at least 3 GPa, or more preferably by at least 5 GPa, such as at least 10 GPa.

The main contributing mode, or the symmetric mode, of the transformer may thus be modified by providing spacers 130 of different modulus of elasticity. The modulus of elasticity may for instance be selected by selecting appropriate materials for the spacers 130. The modulus of elasticity of selectable/applicable materials range between 0.1 GPa-120 GPa, or higher.

Alternatively, the first spacer distribution may comprise spacers arranged at a first distance between each other in a direction around the coil axis and the second spacer distribution may comprise spacers arranged at a second distance between each other in a direction around the coil axis. The first distance is different from said second distance. By decreasing the distance between the spacers in, for instance, the first winding portion as compared to the second winding portion, the stiffness of the first winding portion may be increased as compared to the second winding portion. This would mean a greater number of spacers per unit length of the coil turns 120 in the first winding portion as compared to the second winding portion.

Optionally, the first type of spacers could be structurally shaped to have a first stiffness as seen along the coil axis and the second type of spacers are shaped to have a second stiffness as seen along the coil axis, said first stiffness being different from said second stiffness. The spacers 130 may have structural shapes to provide an increased, or a reduced, stiffness as compared to conventional spacers. Consequently, the first type and the second type of spacers may be of the same material but may be provided with different shapes in order to provide at least the first and the second winding portions with different stiffnesses. As an example, hollow spacers 130 may provide a reduced stiffness as compared to solid spacers 130.

It is advantageous that at least one of the phase windings 110 of the transformer 100 is not provided with different winding portions 116 having different winding portion stiffnesses. Thereby, at least one phase winding may have single type of spacers, which simplifies manufacturing. Also, simulations have shown that better results are achieved when not all phase windings have differing winding portion stiffnesses.

In other words, in an exemplary embodiment, the first winding portion 116*a* of the second type of phase winding 110*b* may have the first winding portion stiffness, as seen along said coil axis, and said second winding portion 116*b* of the second type of phase winding 110*b* may also have the first winding portion stiffness, as seen along said coil axis. As such, the second type of phase winding 110*b* has the same winding portion stiffness, in both the first winding portion 116*a* and in the second winding portion 116*b*. The winding portion stiffness of the second type of winding 110*b* is the same as the winding portion stiffness of the first winding portion 116*b*.

Two exemplary embodiments result in particularly significant noise reduction. In a first exemplary embodiment, the transformer 100 comprises three phase windings 110 arranged along a second axis x. One second type of phase winding 110*b* is arranged centrally, between two first type of phase windings 110*a*.

In a second exemplary embodiment, as shown in FIGS. 6 and 8, the transformer 100 comprises three phase windings 110 arranged along a second axis x, and wherein one first type of phase winding 110*a* is arranged centrally, between two second type of phase windings 110*b*.

Table 1 below shows simulated results of a transformer 100 and transformer arrangement 300 of the second exemplary embodiment shown in FIGS. 6 and 8. The transformer operates at 100 Hz mechanical main frequency. In this example, only the stiffness/elasticity of the spacers 130 is adapted to affect the main contributing mode. As can be seen, the spacers 130 of all the low-voltage windings, e.g., the inner windings, have the same modulus of elasticity. The high-voltage windings of the phase windings 110 on the sides also have spacers of the same modulus of elasticity as the low-voltage windings. Only the high-voltage winding of the middle phase winding 110 is arranged with spacers 130 of a differing modulus of elasticity than the other windings.

The fourth column shows simulated radiated acoustic power as a result of different modulus of elasticity. The acoustic power of a corresponding transformer 100 and transformer arrangement 300 of nominal design is 80.2 dB, which is 10.1 dB higher than the lowest simulated acoustic power of 70.1 dB. Thus, the simulation shows a significant improvement of the transformer 100 and transformer arrangement 300 according to the present disclosure over prior art.

TABLE 1

| LV All Windings (GPa) | HV Side Windings (GPa) | HV Middle Winding (GPa) | Acoustic Power 100 Hz (dB) |
|---|---|---|---|
| 72 | 72 | 38 | 70.7 |
| 52 | 52 | 38 | 71.2 |

TABLE 1-continued

| LV All Windings (GPa) | HV Side Windings (GPa) | HV Middle Winding (GPa) | Acoustic Power 100 Hz (dB) |
|---|---|---|---|
| 52 | 52 | 30 | 71.4 |
| 40 | 40 | 3 | 74.4 |
| 110 | 110 | 3 | 74.1 |
| 110 | 110 | 40.8 | 70.1 |
| 110 | 110 | 40 | 70.13 |

The first exemplary embodiment results in similar noise reduction but is not disclosed herein in detail.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A transformer comprising at least two phase windings, each phase winding having coil turns around a coil axis, said transformer being adapted to transform voltage at a predetermined frequency, when said transformer is operating, said transformer is excited by a mechanical load having a main frequency corresponding to said predetermined frequency multiplied by two and having vibration modes, wherein the combination of load and vibration modes results in a vibration of said transformer, said transformer having a set of vibration modes, each vibration mode having a vibration mode frequency, wherein at least one main contributing vibration mode of the set of vibration modes is the vibration mode resulting in a largest acoustic power, of said vibration modes, when the transformer is excited by said load, the at least two phase windings comprising at least a first type of phase winding and a second type of phase winding, each of the first type of phase winding and the second type of phase winding comprising a plurality of winding portions comprising at least a first winding portion and a second winding portion, the first type of phase winding comprising the first winding portion having a first winding portion stiffness and the second winding portion having a second winding portion stiffness, a stiffness difference between said first winding portion stiffness and said second winding portion stiffness of said first type of phase winding being such that acoustic power is minimized at said main frequency, said first winding portion of the first type of phase winding having the first winding portion stiffness, as seen along said coil axis, and said second winding portion of the first type of phase winding having the second winding portion stiffness, as seen along said coil axis, said first winding portion stiffness being different from said second winding portion stiffness, and the first winding portion of the second type of phase winding having the first winding portion stiffness, as seen along said coil axis, and said second winding portion of the second type of phase winding also having the first winding portion stiffness, as seen along said coil axis, and the transformer comprising three phase windings arranged along a second axis, such that one first type of phase winding is arranged centrally, between two second type of phase windings, or one second type of phase winding is arranged centrally, between two first type of phase windings.

2. The transformer according to claim 1, wherein the first type of phase winding is provided with a plurality of spacers between the coil turns, and wherein the first winding portion of the first type of phase winding is provided with a first type of spacers and the second winding portion of the first type of phase winding is provided with a second type of spacers, said first type of spacers being different from said second type of spacers.

3. The transformer according to claim 2, wherein the first type of spacers has a first modulus of elasticity and the second type of spacers has a second modulus of elasticity, said first modulus of elasticity being different from said second modulus of elasticity.

4. The transformer according to claim 1, wherein said first winding portion is located radially inwards of said second winding portion.

5. The transformer according to claim 1, wherein the predetermined frequency is in a range of 50 Hz to 60 Hz.

6. The transformer according to claim 5, wherein the main frequency is in a range of 100 Hz to 120 Hz.

7. The transformer according to claim 1, wherein the one first type of phase windings is arranged centrally, between two second type of phase windings.

8. The transformer according to claim 1, wherein one second type of phase winding is arranged centrally, between two first type of phase windings.

9. A transformer arrangement comprising a transformer enclosed in a transformer tank, the transformer comprising:

at least two phase windings, each phase winding having coil turns around a coil axis, said transformer being adapted to transform voltage at a predetermined frequency, when said transformer is operating, said transformer is excited by a mechanical load having a main frequency corresponding to said predetermined frequency multiplied by two and having vibration modes, wherein the combination of load and vibration modes results in a vibration of said transformer, said transformer having a set of vibration modes, each vibration mode having a vibration mode frequency, wherein at least one main contributing vibration mode of the set of vibration modes is the vibration mode resulting in a largest acoustic power, of said vibration modes, when the transformer is excited by said load, the at least two phase windings comprising at least a first type of phase winding and a second type of phase winding, each of the first type of phase winding and the second type of phase winding comprising a plurality of winding portions comprising at least a first winding portion and a second winding portion, the first type of phase winding comprising the first winding portion having a first winding portion stiffness and the second winding portion having a second winding portion stiffness, a stiffness difference between said first winding portion stiffness and said second winding portion stiffness of said first type of phase winding being such that acoustic power is minimized at said main frequency, said first winding portion of the first type of phase winding having the first winding portion stiffness, as seen along said coil axis, and said second winding portion of the first type of phase winding having the second winding portion stiffness, as seen along said coil axis, said first winding portion stiffness being different from said second winding portion stiffness, and the first winding portion of the second type of phase winding having the first winding portion stiffness, as seen along said coil axis, and said second winding portion of the second type of phase winding also having the first winding portion stiffness, as seen along said coil axis, and the transformer comprising three phase windings arranged along a second axis, such that one first type of phase windings is arranged centrally, between two second type of phase windings, or one second type of phase winding is arranged centrally, between two first type of phase windings.

10. The transformer arrangement of claim 9, wherein said first winding portion is located radially inwards of said second winding portion.

11. The transformer arrangement of claim 9, wherein the first type of phase winding is provided with a plurality of spacers between the coil turns, and wherein the first winding portion of the first type of phase winding is provided with a first type of spacers and the second winding portion of the first type of phase winding is provided with a second type of spacers, said first type of spacers being different from said second type of spacers.

12. The transformer arrangement of claim 11, wherein the first type of spacers has a first modulus of elasticity and the second type of spacers has a second modulus of elasticity, said first modulus of elasticity being different from said second modulus of elasticity.

13. The transformer arrangement according to claim 9, wherein the predetermined frequency is in a range of 50 Hz to 60 Hz.

14. The transformer arrangement according to claim 13, wherein the main frequency is in a range of 100 Hz to 120 Hz.

15. The transformer arrangement according to claim 9, wherein the one first type of phase windings is arranged centrally, between two second type of phase windings.

16. The transformer arrangement according to claim 9, wherein one second type of phase winding is arranged centrally, between two first type of phase windings.

* * * * *